US 11,995,703 B2

United States Patent
Elmoznino et al.

(10) Patent No.: US 11,995,703 B2
(45) Date of Patent: *May 28, 2024

(54) IMAGE-TO-IMAGE TRANSLATION USING UNPAIRED DATA FOR SUPERVISED LEARNING

(71) Applicant: L'OREAL, Paris (FR)

(72) Inventors: Eric Elmoznino, Toronto (CA); Irina Kezele, Toronto (CA); Parham Aarabi, Richmond Hill (CA)

(73) Assignee: L'OREAL, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,139

(22) Filed: Jan. 27, 2023

(65) Prior Publication Data

US 2023/0169571 A1    Jun. 1, 2023

Related U.S. Application Data

(63) Continuation of application No. 17/096,774, filed on Nov. 12, 2020, now Pat. No. 11,615,516.

(Continued)

(51) Int. Cl.
*G06T 5/50* (2006.01)
*G06F 18/214* (2023.01)
(Continued)

(52) U.S. Cl.
CPC ....... *G06Q 30/0631* (2013.01); *G06F 18/214* (2023.01); *G06N 20/00* (2019.01);
(Continued)

(58) Field of Classification Search
None
See application file for complete search history.

(56) References Cited

U.S. PATENT DOCUMENTS 10,984,286 B2 * 4/2021 Dundar ................ G06F 18/214
11,615,516 B2 * 3/2023 Elmoznino ........ G06Q 30/0631
382/155

(Continued)

OTHER PUBLICATIONS

Indian Office Action dated Nov. 15, 2022, issued in Indian Patent Application No. 202217033475 (with English translation).

(Continued)

*Primary Examiner* — Dov Popovici
(74) *Attorney, Agent, or Firm* — Oblon, McClelland, Maier & Neustadt, L.L.P.

(57) ABSTRACT

Techniques are provided for computing systems, methods and computer program products to produce efficient image-to-image translation by adapting unpaired datasets for supervised learning. A first model (a powerful model) may be defined and conditioned using unsupervised learning to produce a synthetic paired dataset from the unpaired dataset, translating images from a first domain to a second domain and images from the second domain to the first domain. The synthetic data generated is useful as ground truths in supervised learning. The first model may be conditioned to overfit the unpaired dataset to enhance the quality of the paired dataset (e.g. the synthetic data generated). A run-time model such as for a target device is trained using the synthetic paired dataset and supervised learning. The run-time model is small and fast to meet the processing resources of the target device (e.g. a personal user device such as a smart phone, tablet, etc.)

20 Claims, 10 Drawing Sheets

Related U.S. Application Data

(60) Provisional application No. 62/935,715, filed on Nov. 15, 2019.

(51) Int. Cl.
 G06N 20/00 (2019.01)
 G06Q 30/0601 (2023.01)
 G06V 10/764 (2022.01)
 G06V 10/774 (2022.01)
 G06V 10/778 (2022.01)

(52) U.S. Cl.
 CPC .............. G06T 5/50 (2013.01); G06V 10/764 (2022.01); G06V 10/774 (2022.01); G06V 10/7788 (2022.01)

(56) References Cited

U.S. PATENT DOCUMENTS

| | | | | |
|---|---|---|---|---|
| 2019/0080205 | A1* | 3/2019 | Kaufhold | G06N 3/048 |
| 2019/0279075 | A1* | 9/2019 | Liu | G06N 3/045 |
| 2022/0310065 | A1* | 9/2022 | Rosenberg | G06N 3/08 |

OTHER PUBLICATIONS

Li, X et. al., "Attribute Guided Unpaired Image-to-Image Translation with Semi-supervised Learning" https://doi.org/10.48550/arXiv.1904.12428, Apr. 29, 2019.

European Search Report dated Oct. 16, 2023, issued in European Patent Application No. 20886628.5.

Kaji Shizuo et al: "Overview of image-to-image translation by use of deep neural networks: denoising, super-resolution; modality conversion, and reconstruction in medical imaging", Radiological Physics and Technology, Springer: Japan KK; JP, vol. 12, No. 3, Jun. 20, 2019 (Jun. 20, 2019), pp. 235-248, XP036872068, ISSN: 1865-0333, DOI: 10.1007/S12194-019-00520-Y [retrieved on Jun. 20, 2019].

Pfeiffer Micha et al: "Generating Large Labeled Data Sets for Laparoscopic Image Processing Tasks Using Unpaired Image-to-Image Translation", Oct. 10, 2019 (Oct. 10, 2019), Topics in Cryptology—CT-RSA 2020 : The Cryptographers' Track At the RSA Conference 2020, San Francisco, CA, USA, Feb. 24-28, 2020, Cornell University Library, 201 Olin Library Cornell University Ithaca, NY 14853, pp. 119-127, XP047526564; [retrieved on Oct. 10, 2019].

Phillip Isola et al: "Image-to-Image Translation with Conditional Adversarial Networks", arxiv.org, Cornell University Library, 201 Olin Library Cornell University Ithaca, NY 14853, Nov. 21, 2016 (Nov. 11, 2016), XP080733474, DOI: 10.1109/CVPR.2017.632.

Jun-Yan Zhu et al: "Unpaired Image-to-Image Translation using Cycle-Consistent Adversarial Networks", arxiv.org, Cornell University Library, 201 Olin Library Cornell University Ithaca, NY 14853, Mar. 30, 2017 (Mar. 30, 2017), XP080753281, DOI: 10.1109/ICCV.2017.244.

\* cited by examiner

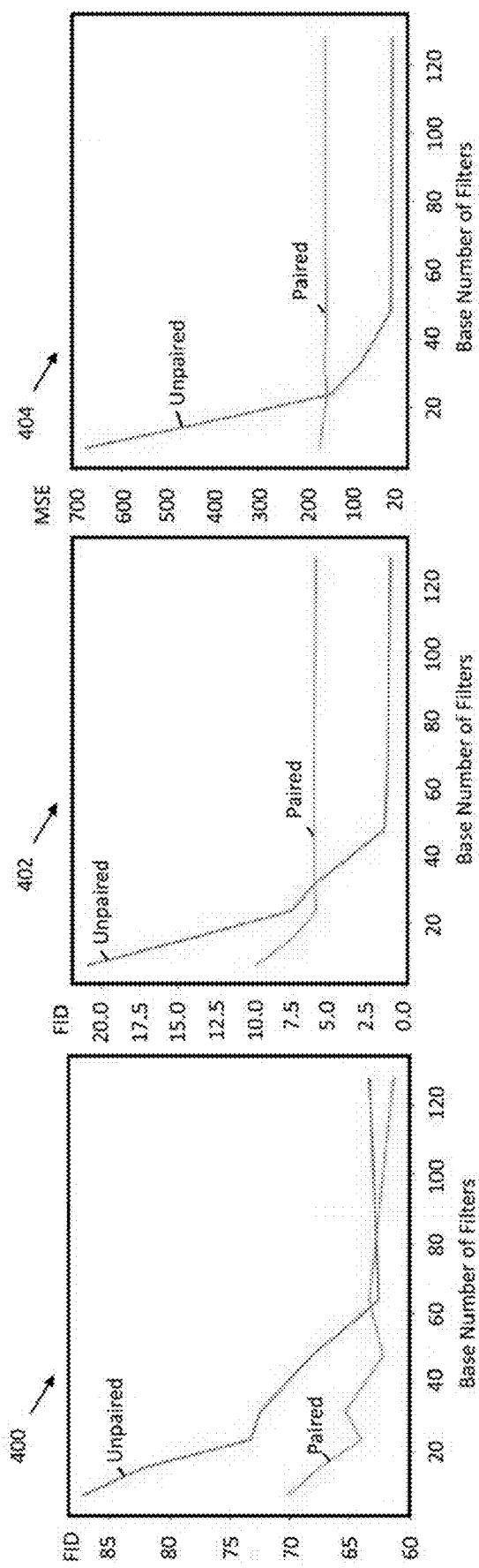

IMAGE-TO-IMAGE TRANSLATION USING UNPAIRED DATA FOR SUPERVISED LEARNING

CROSS-REFERENCE

This application is a continuation of U.S. Application Ser. No. 17/096,774, filed on Nov. 12, 2020, which claims the domestic benefit of U.S. Provisional Application No. 62/935,715 filed Nov. 15, 2019, the entire contents of which are incorporated herein by reference.

TECHNICAL FIELD

The application relates to image processing using machine learning. More particularly, this application relates to image-to-image translation using unpaired data for supervised learning.

BACKGROUND

It is desirable to provide a computing device configured to translate images from one domain to another domain with an applied effect utilizing a small and fast model. Undeniable progress in image-to-image translation has been done over the years, yet it may not be applied in any sort of practical setting. A primary reason for this gap between research and commercial application has been the large sizes and/or processing resource requirements of the proposed models. Commercial applications of image-to-image translation often require on-device inference such as on a consumer smart phone or desktop either in a native application or in a browser; therefore, any of resource utilization and performance are a consideration. Furthermore, real-time video translation typically requires significant processor resources to produce a translation with a great amount of processing speed.

Over the past few years, image-to-image translation has become one of the most researched problems in computer vision. Essentially, the task can be described as finding a mapping between images belonging to different domains in a way that preserves the identity of the original source image (for example, converting images of dogs to images of cats while preserving all other features, such as pose, fur colour, and background).

The field of computer graphics could make use of the technology for easily rendering scenes governed by complex rules without specifying those rules explicitly (e.g. more realistic lighting/shading). Similarly, it has applications in the rapidly growing commercial application of augmented reality, where it may help transform the visual world for a variety of purposes. Image-to-image translation may be used in the context of style transfer to aid consumers and professionals alike in designing personalized products or works of art through applications that let them combine different objects and styles. Image/video editing would also benefit greatly through techniques such as complex and implicitly defined filter applications, coloration, and super-resolution, which can all be accomplished using image-to-image translation models. The practical benefits of the technology are vast, and this is by no means an exhaustive list.

Defining a model to perform image-to-image translation usually benefits from having paired image data for training the model, where an image in the first domain without the applied effect is paired with its corresponding image in the second domain having the applied effect. The images correspond in that any other differences between the first image and second image are minimal. However, defining such paired image data is difficult as such images in the two domains rarely occur naturally and manually generating such data is time and resource intensive.

SUMMARY

For many image-to-image translation tasks, it is either very difficult or practically impossible to obtain a paired dataset suitable for supervised learning using deep learning. As such, several methods have been developed in recent years to train directly on unpaired data. Although these methods often achieve impressive results, they typically require powerful models that are not suitable for real-time on-device inference, which greatly limits the scope of their practical applications. In this disclosure there is provided techniques for training small and fast models given only an unpaired dataset. A method comprises first conditioning and preferably overfitting a powerful model to the unpaired dataset using existing unsupervised learning methods in order to generate a synthetic paired dataset in which the generated results serve as ground truth.

Using this paired dataset, a compact but weaker model more suitable for deployment is trained using existing supervised learning methods. Since supervised learning is an easier task, the weaker model tends to achieve far better performance than if it were trained using unsupervised methods on the original unpaired dataset directly. Benefits are demonstrated empirically on two image-to-image translation tasks of differing difficulty: 1) hair coloration and 2) application of a digital filter.

In accordance with an embodiment there is provided a system (e.g. a computing device) to translate an image from a first domain space to a second domain space according to an effect to be applied to the image. The system is configured to generate two models, a first model defining a data pairing model and a second model defining a run-time model. The first model is to be conditioned through training using a plurality of unpaired images. The plurality of unpaired images comprise a first subset of images defined in the first domain space having no effect applied and a second subset of images defined in the second domain space having the effect applied. The first model is configured to translate the first subset of images to the second domain space to generate first fake images to pair with the first subset and to translate the second subset of images to the first domain space to generate second fake images to pair with the second subset. Providing the plurality of unpaired images to the trained first model generates a plurality of paired images defined by the first subset and the first fake images and the second subset and the second fake image respectively. In an embodiment the first model is overfitted to maximize performance on the plurality of unpaired images. In an embodiment, the run-time model is to be conditioned through training using the plurality of paired images and is configured to translate images in the first domain space to images in the second domain space and to be executed on a target device.

In accordance with teachings and embodiments herein there is provided a method to train a model for image to image translation. The method comprises: training a powerful image translation model using an unpaired dataset of images using unsupervised learning techniques, the powerful image translation model trained to generate a synthetic paired dataset of images from the unpaired dataset, the unpaired dataset comprising a first subset of images in a first domain space and a second subset of image in a second domain space; and training a run-time model using supervised learning techniques where synthetic data generated from the powerful images translation model provide ground truths for the training, the run-time model trained to translate images from the first domain to the second domain and the run-time model comprising a compact and fast model in comparison to the powerful image translation model.

In accordance with this method and the teachings and embodiments herein, there is provided a computing device comprising a processor and a storage unit, the storage unit storing instructions for execution by the computing device to perform the method. In accordance with this method and the teachings and embodiments herein, there is provided a computing device comprising a processing unit and a storage unit, the storage unit storing the run-time model as trained by the method and storing instructions, which instructions when executed by the processing unit, configure the computing device to use the run-time model to translate an age from the first domain to produce an image in the second domain.

In accordance with the teachings and embodiments herein there is provided a computing device to define a trained run-time model to translate an image from a first domain space to a second domain space according to an effect to be applied to the image, the computing device comprising: a storage unit storing: i. a plurality of unpaired images comprising a first subset of images defined in the first domain space having no effect applied and a second subset of images defined in the second domain space having the effect applied; ii. a first model to be conditioned through training using the plurality of unpaired images, the first model configured to: 1. translate the first subset of images to the second domain space to generate first fake images to pair with the first subset; and 2. translate the second subset of images to the first domain space to generate second fake images to pair with the second subset; wherein the first subset and the first fake images and the second subset and the second fake images respectively define a plurality of paired images; and iii. a run-time model configured to translate images in the first domain space to images in the second domain space and to execute on a target device when trained, the run-time model to be conditioned through training using the plurality of paired images; and a processing unit configured to: train with the plurality of unpaired images to generate the first model as trained; provide the plurality of unpaired images to the first model as trained to generate the first fake images and the second fake images; pair the first fake images and the second fake images with their respective first subset of images and second subset of images to generate the plurality of paired images; and train with the plurality of paired image to generate the trained run-time model. Also provided are related method, and computer program product aspects, including computer program products and computing devices configured with a run time model as so trained.

In accordance with the teachings and embodiments herein there is provided a computer program product comprising a non-transient storage unit storing instructions and for data, which, when the instructions are executed by a processing unit of a computing device, the computing device is configured to perform a method to translate an image from a first domain space to a second domain space according to an effect to be applied to the image; wherein: a. the storage unit storing a run-time model to translate the image from the first domain space to the second domain space, the run-time model conditioned through training using a plurality of paired images, each of the paired images comprising a first image in the first domain space and a second image in the second domain space, the plurality of paired images generated by translating a plurality of unpaired images using a first model, wherein: i. the plurality of unpaired images comprises a first subset of images defined in the first domain space having no effect applied and a second subset of images defined in the second domain space having the effect applied: and ii. the first model comprises a model conditioned through training using the plurality of unpaired images, the first model configured to: 1. translate the first subset of images to the second domain space to generate first fake images to pair with the first subset: and 2. translate the second subset of images to the first domain space to generate second fake images to pair with the second subset; wherein the first subset and the first fake images and the second subset and the second fake images respectively defined the plurality of paired images; and b. the processing unit is configured to: provide the image to the run-time model; and provide the image as translated by the run-time model for presenting.

In accordance with teachings and embodiments herein, there is provided a computing device to generate a plurality of paired images from a plurality of unpaired images by translating images from a first domain space to a second domain space according to an effect to be applied to the images, the computing device comprising: a. a storage unit storing: i, the plurality of unpaired images comprising a first subset of images defined in the first domain space having no effect applied and a second subset of images defined in the second domain space having the effect applied; and ii. a model to be over trained to maximize performance on the plurality of unpaired images and configured to: 1. translate the first subset of images to the second domain space to generate first fake images to pair having the first subset; and 2. translate the second subset of images to the first domain space to generate second fake images to pair with the second subset; and b. a processing unit configured to: overfit with the plurality of unpaired images to generate the first model as overfitted; provide the plurality of unpaired images to the first model as overfitted to generate the first fake images and the second fake images; and pair the first fake images and the second fake images with their respective first subset of images and second subset images to generate the plurality of paired images.

BRIEF DESCRIPTION OF THE DRAWINGS

FIGS. 4A, 4B and 4C are graphs of performance metrics of a hair coloration and a digital filter effect, in accordance with respective examples.

Figure 1:
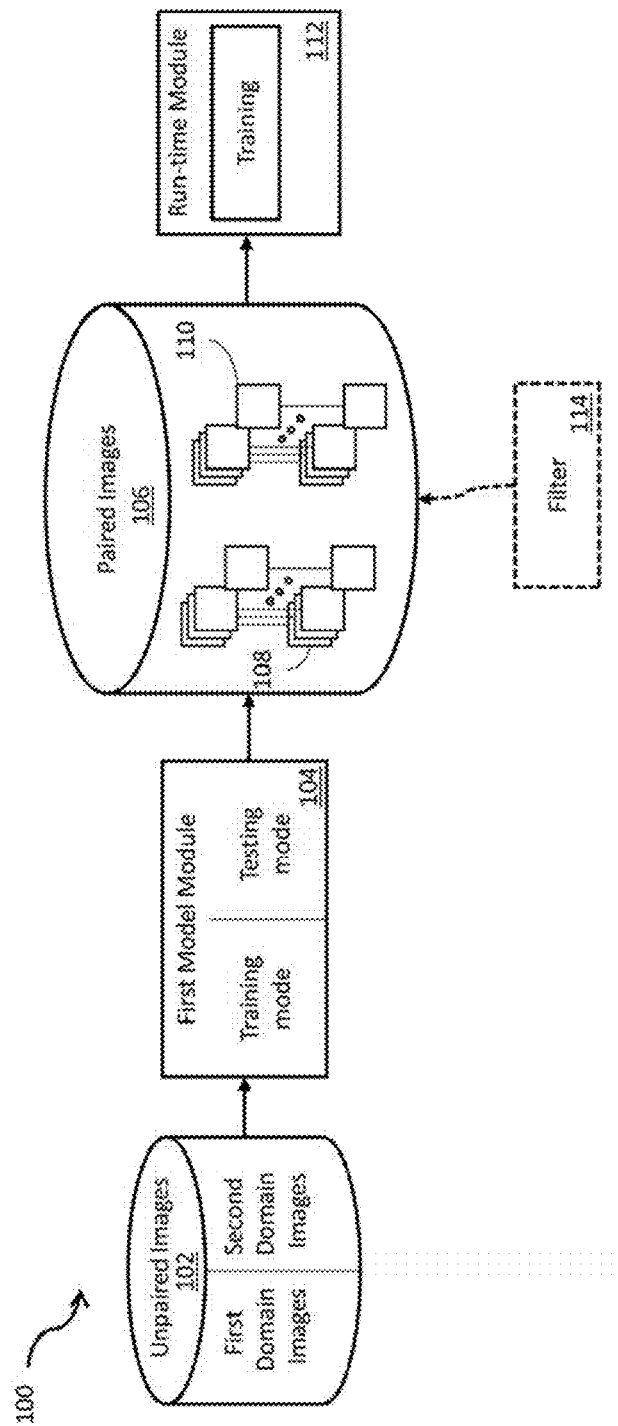
FIG. 1 is a block diagram of a developer computing environment including components for conditioning a data pairing model and a run-time model in accordance with an embodiment.

FIGS. and 10 are each flowcharts showing operations, in accordance with embodiments herein.

DETAILED DESCRIPTION image-to-image translation refers to the task of converting (translating) an image between two or more feature domains using a model. Ideally, only the features of the image that vary between the domains should be modified, while all other features remain identical. The task can be thought of as a special case of style-transfer where no reference image specifying the destination style for a particular generated image is provided, Instead, training data is separated according to the different domains and the model learns a mapping function between the different domains.

Image-to-image translation and style transfer are long-standing problems in computer vision and have benefited from a large body of work [3-8]. Recently, significant progress has been made in achieving perceptually realistic results due to the advent of Generative Adversarial Networks (GANs) [9]. In particular, Isola et al. [1] generated images of superior subjective quality to previous methods using a simple supervised loss in conjunction, with an adversarial one. Their approach, however, required a paired input-output dataset, which can be difficult or even infeasible to obtain for many tasks.

Several methods have since been introduced that leverage unsupervised data for image-to-image translation [10-12]. A landmark work in the field was Zhu et al.'s [2] CycleGAN, which learns from an unpaired dataset by using a pair of GANs and a novel cycle-consistency loss [13] between image domains. In their method, each generator/discriminator pair specializes in translating images in one direction (i.e. from domain A to B or vice-versa). Since this translation is under-constrained and does not ensure that features of the original images will be preserved, the method also converts translated images back to their original domains and employs an identity loss. This cyclic loss essentially enforces a one-to-one mapping between the domains. The generators achieve this mapping by only modifying features relevant to the intended translation task, since any other feature modifications would result in a loss of information that makes retrieval of the original image more difficult.

It has been shown that very large generator networks are typically required to achieve good results using GAN-based methods [14], making them poorly suited for many practical applications such as real-time performance on mobile devices. Live video (e.g. re time or on the fly) applications using models that do frame-to-frame translation, for instance, are not possible at reasonable frame rates. There is, therefore, a great interest in exploring new image-to-image translation methods using GANs models.

A goal is to train a model on a task for which only a plurality of unpaired images are available. The model may be trained for a target device such as a consumer device where a small and/or fast model (preferably both) is desired to give desired resource utilization and performance characteristics. Given observations that weaker models tend to have poor performance when trained using a plurality of unpaired images directly, the present disclosure describes generating a synthetic plurality of paired images obtained by training a more powerful model using the plurality of unpaired images.

Overfit a Powerful Model Using a Plurality of Unpaired Images

Current training methods that use a plurality of unpaired images cannot back propagate a signal that directly optimizes performance on the task, such as a mean-squared-error, and must instead rely on indirect signals such as those provided by adversarial learning. As such, learning from a plurality of unpaired images is a more difficult task that in turn requires a powerful model.

FIG. 1 is a block diagram of a simplified developer computing environment 100 including components for conditioning a data pairing model 104 and a run-time model 112 in accordance with an embodiment. Computing environment 100 may comprise one or more computing devices having one or more storage devices. A more detailed example is shown and described with reference to FIG. 7. The storage device of a computing device may comprise a memory (RAM/ROM), etc. such as for providing instructions to a processing unit, which may be a graphics processing unit or processing unit such as a server. It will be understood that a processing unit may comprise more than one processor core. A developer computing environment may comprise more than one computing device such as a plurality of linked devices.

In the present embodiment there is provided a plurality of unpaired images 102 to train the first model 104, which is a powerful model. The plurality of unpaired images may be used to overfit the first model 104 to achieve improved results for the training dataset even at the expense of power performance on non-training data. In this way, the results produce improved paired data. Overfitting in statistics and model building refers to learning more details or particulars about examples (e.g. including noise) at the expense of learning to notice features, more broadly. An overfit model corresponds closely or exactly to the examples used to define it and may fail to fit additional data or predict future observations well. While overfitting is considered undesirable for model training generally as such models are defined for use to translate images broadly from one domain to another (or in both directions), it is useful in the present task as it defines well-paired images in the two domains for use in a second supervised learning task with a second model (e.g. the run-time model).

The plurality of unpaired images 102 comprises a subset of images in the first domain space, having no effect applied and another subset of images in the second domain space with an effect applied.

The first model comprises two sub-models trained with the plurality of unpaired images. A first sub-model is to be conditioned with training to translate images from the first domain space to the second domain space using the subset of images in first domain space as input and the subset of images in the second domain space as target. A second sub-model is to be conditioned with training to translate images from the second domain space to the first domain space using the subset of images in the second domain space as input and the subset of images in the first domain space as target.

After training the first model (i.e. after each sub-model is trained), the first model is used to translate the subset of images in the first domain to the second domain and vice versa, That is the first sub-model translates images from the first domain to the second domain and the second sub-model is used to translate the subset of images in the second domain to the first domain; hence, generating paired images each in a domain. This results in the following sets of images comprising the plurality of paired images 106: 1) real images in first domain and fake images in the second domain 108, 2) real images in the second domain and fake images in the first domain 110.

If the desired task is to train a model that translates images from the first domain to the second domain, then the plurality of paired images comprises real images in first domain and fake images in the first domain as input and their paired counterparts as ground truths.

In one embodiment, CycleGAN [2] is used to train on the unpaired plurality of images mainly for its popularity in prior work and its status as the vanilla unpaired image-to-image translation training method, although any unpaired training method can be substituted in principle. For example, machine learning models may be used that employ marginal distributions of the plurality of unpaired images to learn the joint distribution of the plurality of unpaired images such as Generative Adversarial Networks including Dual Generative Adversarial Network, Cycle Consistent Adversarial Network, and a Coupled Generative Adversarial Network.

Filter and Process the Plurality of Paired Images

A filter 114 is optionally stored in the storage device configured to filter pairs of images from the output of the first model using a quality measure, which output is generated for use to condition the run-time model 112. The filter may be applied at any time prior to use to condition the run-time model (e.g. before or after storing the paired image such as to a database.)

In an embodiment, the filter is used to ensure the quality of the generated plurality of paired images. Any of the generated results may have too many undesired artifacts, or the model may have failed entirely in applying the correct transformation. Such results constitute noisy labels in the paired dataset, and so they are pruned by automatic or manual means in order to make training the run-time model more stable.

Further methods may be used to process the generated outputs in order to improve their quality or eliminate artifacts. For instance, a model trained to modify certain facial attributes (e.g. apply a facial effect comprising any of, for example, a make-up effect, facial skin treatment effect, cosmetic surgical effect/body augmentation effect (e.g. implant effect, scarification effect, piercing effect, stretching effect, tattoo effect, tooth effect (e.g. coloration effect, shaping effect, alignment effect, or replacement effect), constructive/reconstructive or other surgical effect, eye coloring/contact lens effect, eyewear effect, etc.; or the opposite of any of these listed facial effects) would benefit if artifacts in the background of generated, images were masked out using boundaries defined with facial landmarks By way of an example, an opposite of a listed facial effect is a removal of that effect that is present in an original image such as removal of a scar, removal of a tattoo, removal of makeup, removal of eyewear, etc. The developer computing environment components may be configured accordingly.

Train a Run-Time Model Using the Generated Plurality of Paired Images

A run-time model 112 configured to translate an image from a first domain space to a second domain stage is stored in the storage device of the computing device. The run-time model is to be conditioned with training using the plurality of paired images generated from the first model. Although fake images (e.g. image translation outputs from the first model) in the first and second domains are entirely synthetic and generated by an earlier step according to the present teaching, the run-time model trained using the generated plurality of paired images (supervised training) outperforms a model trained with the plurality of unpaired images (unsupervised training) when performance is measured on a plurality of test images.

The trained run-time model may then be used (e.g. adapted) to define an application for execution on a target device, for example, to provide real-time translation from the first domain space to the second domain space to provide augmented reality, virtual reality and/or mixed reality experiences such as by modifying images or a video for presenting by the target device. The target device may be a personal device (e.g. a user device) such, as a mobile phone, tablet, etc.

The approach herein is particularly useful when the image-to-image translation task consists of a one-to-one or a many-to-one correspondence between the first domain and the second domain. If this condition is not met, the synthetic paired dataset will be generated according to a multimodal distribution and the supervised task will be undefined.

Experiments

Datasets

Figure 2:
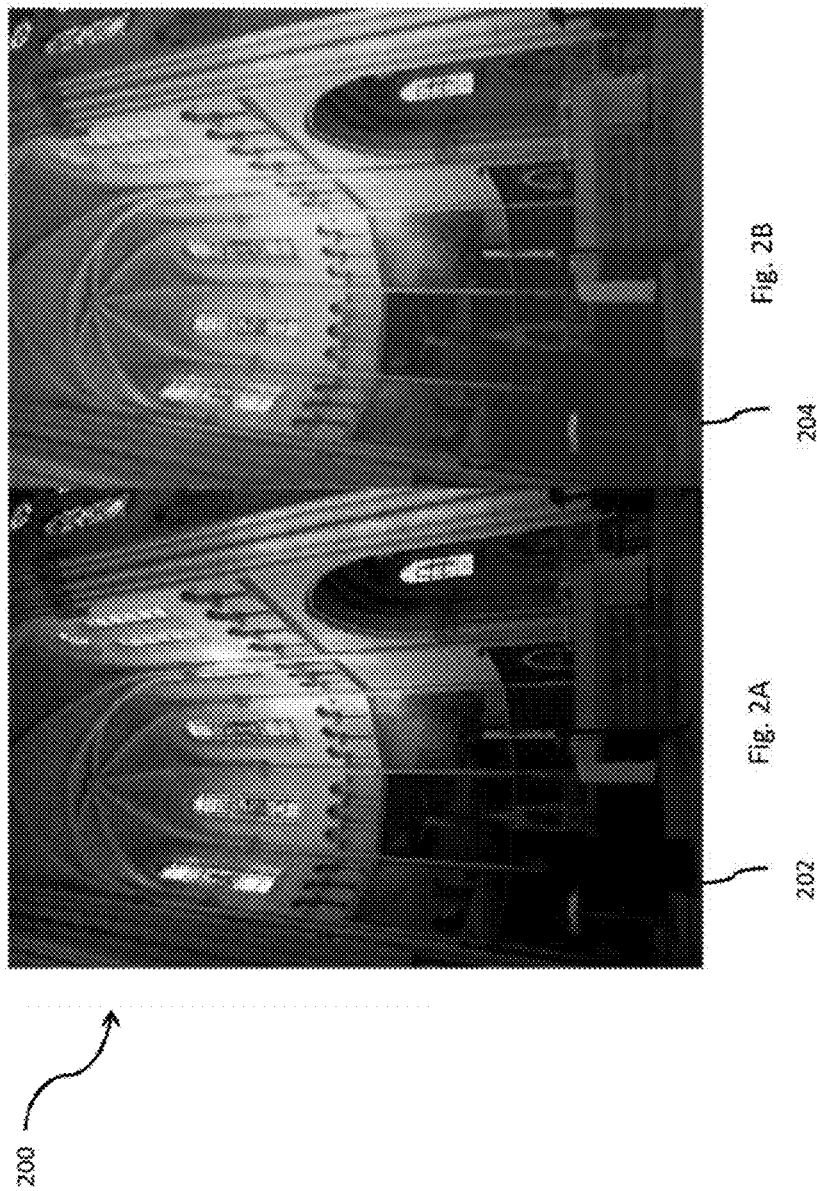
FIGS. 2A and 2B are a pair of images side-by-side including an original image and an image of a digital filter effect applied to the original image, in accordance with an embodiment.

In order to test in a rigorous manner the hypothesis that a computing device that is configured to train a (powerful) data pairing model and a (small and fast) run-time model performs better than a computing device that is configured to train a powerful model only, experiments were performed on a dataset containing a plurality of paired images for which objective performance metrics can be computed. The 5,000 images from the MIT-Adobe FiveK Dataset [15] were used and split into a training set of 4,500 images and a testing set of 500 images. From these, counterparts were generated by applying a digital filter (e.g. the Eboye Photoshop action [16] (Photoshop is a trademark of Adobe Inc., San Jose, CA), which applies an edge-preserving Instagram®'-like filter (Instagram is a trademark of Instagram LLC, Menlo Park, CA). The first model 104 is to be conditioned to translate images between the first and second domains. FIGS. 2A and 2B show a pair of images 200 including an original image 202 and one image 204 where the digital filter was used to apply the effect.

Figure 3:
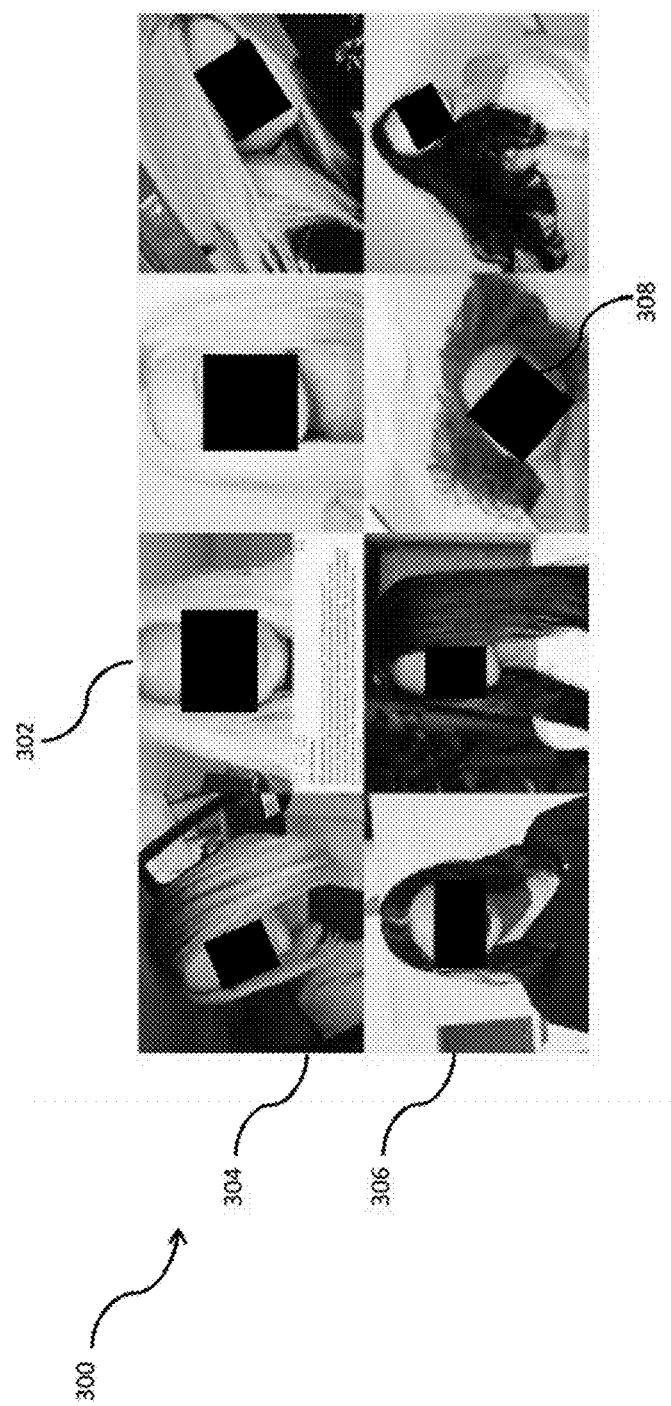
FIG. 3 is an array of images showing a sample mined from online sources for a hair coloration effect, in accordance with an embodiment.

To further evaluate the models, images were mined from online sources to create an unpaired dataset of dark haired individuals and blonde individuals, where the translation task is to convert between the dark haired and blonde domains. It is worth noting that despite manual filtering efforts, this dataset is unclean in the sense that it contains images that differ significantly along several factors including source (e.g. social media vs, advertisements), presence of artificial filters, quality of camera, pose, and lighting, among others. In addition, the size of the dataset is limited, consisting of 3,192 blonde haired images and 2,242 dark haired images from which 200 images in each set were reserved for testing, Despite these caveats, the models were successfully trained to learn how to apply the correct hair coloration transformation in a majority of the cases. FIG. 3 shows a plurality of unpaired images 300 comprising low resolution images from social media (e.g. 302) in an array. The array shows a first row of blonde hair images 304, and a second row of dark hair images 306 including privacy masks (e.g. 308) applied for privacy herein, though such masks are not applied for any training or testing.

Evaluation Process

A number of model architectures are trained on both the plurality of unpaired images as well as the plurality of paired images and the Frechet Inception Distance (FID score) [17] on the same test set are compared. According to a hypothesis, the FID score for small models should be lower when trained using the plurality of paired images.

To simulate a real-life scenario of an unpaired plurality of images, the training set comprises a first subset of images in the first domain space with no effect applied and a second subset of images in the second domain space with an effect applied, wherein each of the first subset of images in first domain space has no equivalent in the second subset of images having the effect applied and each of the second subset of images in the second domain space has no equivalent in the first subset of images having no effect applied.

Since paired images are available in the test set, the Minimum Squared Error (MSE) is also computed as a more objective measure of performance than the FID score.

Model Descriptions

The first and run-time models are UNet models [18] at a resolution of 256×256 pixels. UNet models are commonly used for image-to-image translation tasks.

In order to assess the effectiveness of the models as a function of model size and speed, variations of UNet are trained where the number of filters is scaled uniformly at each layer. Whereas the standard UNet architecture contains a base of 64 filters at the output of the first block, the UNet architecture is additionally trained using a base of 8, 16, 24, 32, 48, and 128 filters. The number of parameters and FLOPS for each of these models are displayed in Table 1.

TABLE 1

Size and speed metric for UNet models used in the experiments

| Base filters | Parameters (M) | MAdds (M) | FLOPS (M) |
|---|---|---|---|
| 8 | 0.852 | 224 | 39 |
| 16 | 3.404 | 816 | 139 |
| 24 | 7.656 | 1780 | 300 |
| 32 | 13.608 | 3110 | 523 |
| 48 | 30.611 | 6870 | 1150 |
| 64 | 54.414 | 12110 | 2030 |
| 128 | 217.618 | 47810 | 7990 |

Results

In order to produce the plurality of paired images for both the hair coloration and digital filter effect, a Residual Neural Network (ResNet) with 12 residual blocks and a base of 64 filters is overfitted (e.g. the first model maximized its performance on the plurality of unpaired images even if such training leads to poor performance on a test set (e g. of other images)). Images at a scale of 512 pixels on the smaller dimension are used in training such that finer details for fake images can be produced. Providing the plurality of unpaired images to the trained first model generates the plurality of paired images. Afterwards, for facial images, artifacts outside the hair are masked out using a proprietary hair segmentation model [20] and then the images are manually filtered to remove poor results. This results in a total of 3,593 dark to blonde paired images. For the digital filter effect, no filtering is performed since the generated images are indistinguishable from the ground truth by visual inspection.

FIGS. 4A-4C present FID results (FIGS. 4A and 4B) for increasingly powerful UNet architectures for both the hair coloration effect 400 and digital filter effect 402, as well as the MSE for the digital filter effect 404 (FIG. 4C). These results indicate that the hypothesis is true and that smaller models achieve better results when trained using a plurality of paired images produced by a more powerful model trained using a plurality of unpaired images. This trend is seen most clearly in the results for the digital filter effect 402 and 404, where up until the 24 base filter model the results on the plurality of paired images are significantly better than those trained using the plurality of unpaired images. To a less obvious degree, the same conclusion can be reached for the hair coloration effect 400, where the FID for the smallest 8 base filter trained using paired model is comparable to that of the much larger 48 base filter trained using unpaired one.

Figure 5A:
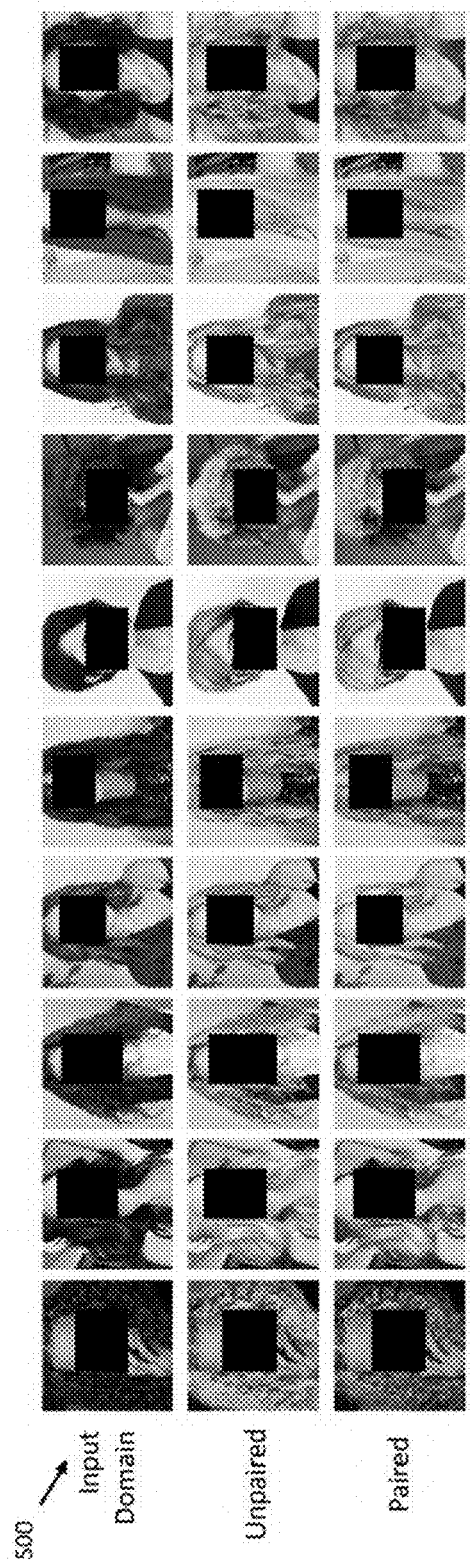
FIG. 5A is an array of images showing: i) in a top row, a plurality of input images to which a hair coloration effect is to be applied to each using a run time model; ii) in a middle row, a plurality of output images where the hair coloration effect was applied to the input images by a run-time model trained using unpaired images (e.g. using unsupervised learning) and iii) in a bottom row, a plurality of output images where the hair coloration effect was applied to the input images using a run time model trained using paired images in accordance with an example of the present teaching.
Figure 5B:
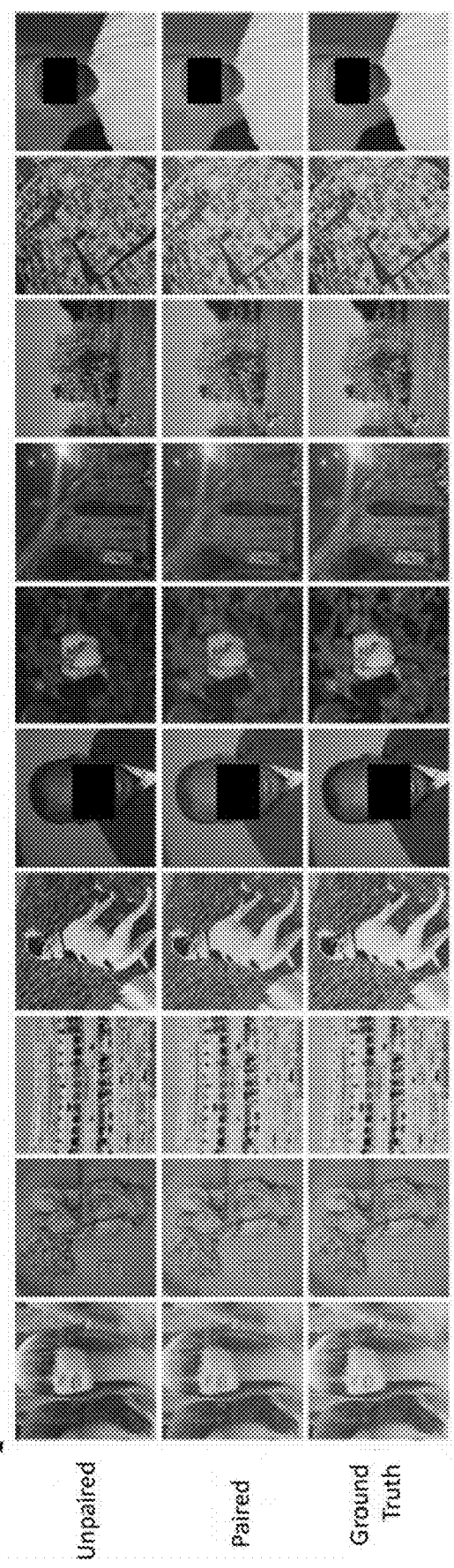
FIG. 5B is an array of images showing, in the first two rows, outputs of a digital filter effect when a run-time model is trained with i) in a top row, a plurality of unpaired images (unsupervised learning) and ii) in a middle row, a plurality of paired images in accordance with an example of the present teaching, and, in the bottom row a comparison to ground truth images applying the digital filter using a propriety software.

FIGS. 5A and 5B present results (where results are respective output images) for two 8 base run-time filter models in respective arrays 500 and 502, where a model is trained using a plurality of unpaired images and another model is trained using a plurality of paired images. The results in FIG. 5A are for the hair coloration effect 500 for input images in a top row and show the results for the model trained with unpaired images (i.e. unsupervised learning) in a middle row and the results for the model trained with paired images (i.e. supervised learning) in a bottom row, where the paired images are generated using the teaching herein. The results in the array 502 of FIG. 5B for the digital filter effect show the results for the model trained with unpaired images in a top row and the results for the model trained with paired images in a middle row, where the paired images are generated using the teaching herein. The bottom row of array 502 shows ground truth images as generated for comparison. Notably, whereas this model was unable to even learn the coloration transform when trained on unpaired images, it consistently applies it when trained on paired images and produces convincing results in many cases.

Figure 6:
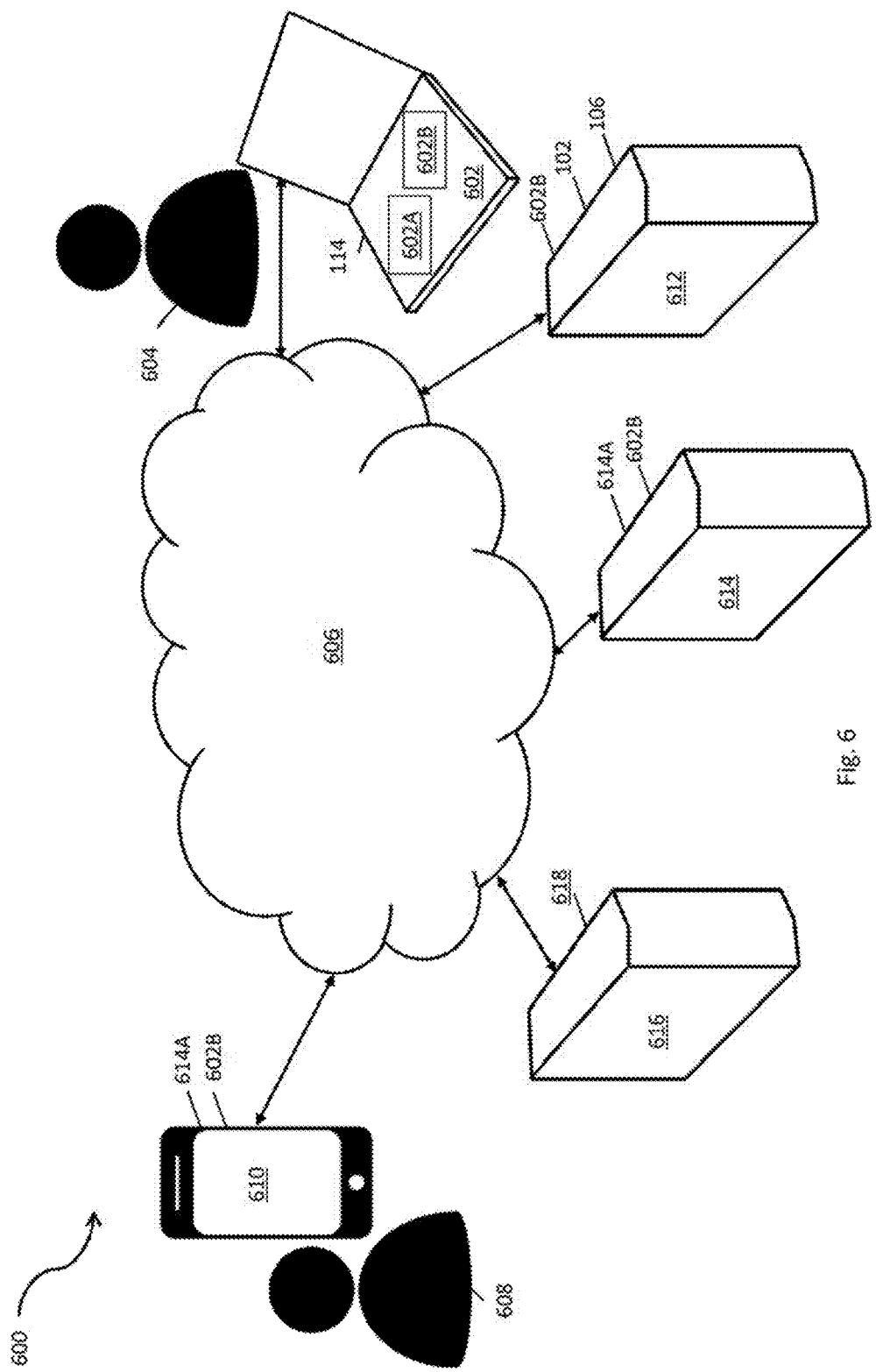
FIG. 6 is a block diagram of a computer network of computing devices, in accordance with an embodiment.

FIG. 6 is a block diagram of an example computer network 600 in which a developer computing device 602 operated by a user/developer 604 is in communication via a communications network 606. Also shown is a second user 608 and a target computing device 610 configured for communications via communications network 606. Second user 610 may be a consumer. Server computing devices 612, 614 and 616 are in communication with communications network 606, for example, to communicate with one or more of devices 602 and 610 as further described.

Developer computing device 602 is configured to train a powerful model, it may have a higher storage, processing power, and memory than the target device. Examples of developer computing device 602 may include, but are not limited to, a computing device built to maximize graphics or other processing performance. While depicted as a laptop, other form factors for computing device 602 are included that meet the task. It is understood that, in some examples, a developer computing device may include a plurality of devices. In one example, a first computing device instructs a more powerful second computing device to perform the training task (or components thereof). In some instances a plurality of computing devices perform the task in cooperation.

Target computing device 610 is configured to execute a small and fast model. Target computing device 610 may have a reduced storage, processing power, and memory in comparison to the developer device 602. Examples of target computing device 610 may include, but are not limited to, a personal computer, a laptop computer, a tablet computer, a notebook computer, a hand-held computer, a personal digital assistant (PDA), a mobile phone, a smart phone, and any other type of computing device that may be configured to store data and software instructions, execute software instructions to perform operations, and/or display information on an interface module, consistent with disclosed embodiments.

Developer computing device 602 is configured, in an example, to train two mode a first model 602A and a run-time model 602B using the first model module 104 and the run-time module 112 (in FIG. 1), respectively, to translate an image from a first domain space to a second domain space. The developer computing device 602 uses a plurality of unpaired images 102 to train the first model. It then feeds the unpaired images to the first model to generate a plurality of paired images 106. The plurality of paired images is used to train the run-time model 602B. The developer computing device 602 may be provided with the unpaired images 102 from server computing device 612 or the unpaired images may be stored and utilized on board developer computing device 602. The developer computing device 602 may store the run-time model 602B in server 612 (or another server, not shown) to be fetched by target device 610 for execution. Target device 610 may also store the run-time model 602B on board for execution.

Each of the first model 602A and run-time model 602B may be trained, in an example, in different developer computing devices (not shown) that communicate with each other, and the plurality of paired images 106 (in FIG. 1) and filter 114 (in FIG. 1) may be stored in one of the developer computing devices or in a separate computing device. As described, the unpaired images may be obtained from server computing device 612 or the unpaired images may be stored and utilized on board one or both of the developer computing devices.

Developer computing device 602 is configured to train a first and a run-time model to translate images from a first domain to a second domain according to an effect to be applied to the image. The effect may be one of the facial effects previously described (including a makeup effect), a hair coloration effect, a hairstyle effect, a manicure effect, and a pedicure effect, etc. The effect may also be a three dimensional effect. The effect may also be one of a painting and a building style, a coloration of images, a filter application, a super-resolution application, a translation from satellite images to maps, and a translation from sketches to photographs, etc. The effect may also a translation of features between different objects and subjects, for example converting images of dogs to images of cats while preserving all other features such as pose, fur, color and background, etc.

Target computing device 610 is configured to receive the run-time model 602B developed by developer computing device 602. Target computing device 610 may receive the run-time model 602B through communication via communications network 606 to developer computing device 602 or from server 612, or any other method to digitally transfer data (e.g. a download from an application store (e.g. an e-commerce service provided by a server computing device 614)). The run-time model 602B is typically incorporated into a run-time application 614A (e.g. downloaded from an application store) that executes the model 602B User 608 of target computing device 610 provides an image or a video to the run-time application 614A to execute the run-time model 602B producing an image or video with the effect applied. The provided image or video may be stored on target computing device 610, received from a server or other computing device (e.g. via a web (e.g. http) or other communication (e.g. text message, instant message, short message service, proprietary message, email, etc.)), acquired from an input device of or coupled to target computing device 610 (e.g. a camera), or through other methods capable of providing an image or a video.

In an example, an effect to be applied to an image is associated with one or both of a product and a service (e.g. a product and/or service). In an example, the effect is a makeup effect associated with a product. In an example, the effect is a skin treatment effect associated with a service and a product. In an example, the application provides an interface to an e-commerce service (e.g. an application 616) available from server computing device 616 to purchase the product for the makeup effect or the service and product for the skin treatment effect. Payment services and a payment network are not illustrated in FIG. 6.

Figure 7:
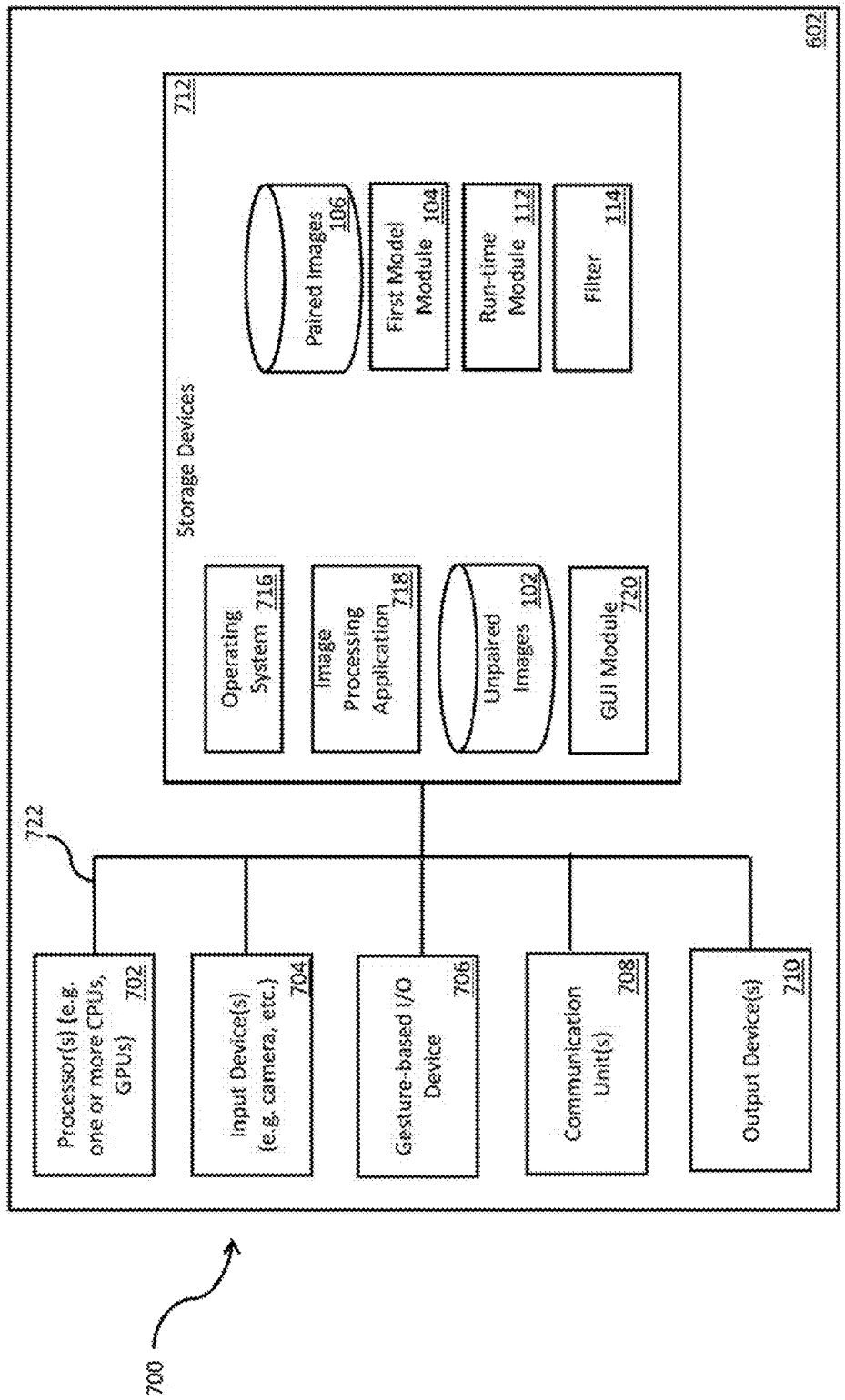
FIG. 7 is a block diagram of a developer computing device according to an example, in accordance with an embodiment.

FIG. 7 is a block diagram of developer computing device 602, in accordance with one of more aspects of the present disclosure. Developer computing device 602 comprises one or more processors 702, one or more input devices 704, a gesture-based I/O device 706, one or more communication units 708 and one or more output devices 710. Developer computing device 602 also includes one or more storage devices 712 storing one or more modules and/or data. Modules may include first model 104 and run-time model 112, filter 114: graphical user interface (GUI 720); and image processing application 718. Image processing application may be used to apply a digital filter and/or view an output image and/or image pair from the trained first model, etc. Data may include one or more of plurality of unpaired images 102 and plurality of paired images 106.

Storage device(s) 712 may store additional modules such as operating system 716 and other modules (not shown) including communication modules; photo (image/media) editor: media player and/or streaming module; browser module; etc. Storage devices may be referenced as storage units herein.

One or more processors 702 may implement functionality and/or execute instructions within computing device 602. For example, processors 702 may be configured to receive instructions and/or data from storage devices 712 to execute the functionality of first model module 104, run-time module 112, and filter 114, among others (e.g. operating system, image processing application 718, etc.) Developer computing device 602 may store data/information to storage devices 712. It is understood that operations may not fall exactly within modules 102, 104, 106, 112, 114, 718 and 716 such that one module may assist with the functionality of another.

One or more processors 702 send requests to translate an image or video stored on board or acquired from a camera 704 from a first domain space to a second domain space according to an effect. The processing unit 702 provides the plurality of unpaired images 102 to the first model module 104 to train a first model. It then provides the plurality of unpaired images 102 to the trained first model to generate a plurality of paired images 106 provided to train a run-time model utilizing run-time module 112. Processing unit may request an optional filter 114 to filter the plurality of paired images before providing to train the run-time model.

Communication channels 722 may couple each of the components 702, 704, 706, 710, 712, and any modules 104, 112, 114, 716, 718, and 720 for inter-component communications, whether communicatively, physically and/or operatively. In some examples, communication channels 722 may include a system bus, a network connection, an inter-process communication data structure, or any other method for communicating data.

Computer program code for carrying out operations may be written in any combination of one or more programming languages, e.g., an object oriented programming language such as Java, Smalltalk, C++ or the like, or a conventional procedural programming language, such as the "C" programming language or similar programming languages.

Developer computing device 602 may generate output for display on a screen of gesture-based I/O device 706 or in some examples, for display by a projector, monitor or other display device. It will be understood that gesture-based I/O device 706 may be configured using a variety of technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

In the examples described herein, gesture-based I/O device 706 includes a touchscreen device capable of receiving as input tactile interaction or gestures from a user interacting with the touchscreen. Such gestures may include tap gestures, dragging or swiping gestures, flicking gestures, pausing gestures (e.g. where a user touches a same location of the screen for at least a threshold period of time) where the user touches or points to one or more locations of gesture-based I/O device 706. Gesture-based I/O device 706 and may also include non-tap gestures. Gesture-based I/O device 706 may output or display information, such as graphical user interface, to a user/developer. The gesture-based I/O device 706 may present various applications, functions and capabilities of the developer computing device 602 including, for example, image processing application 718 to view images, process the images and display new images, messaging applications, and other applications or functions among others.

The one or more communication units 708 may communicate with external devices (e.g. server 612, target computing device 610) such as for the purposes as described and/or for other purposes (e.g. printing) such as via communications network 606 by transmitting and/or receiving network signals on the one or more networks. The communication units may include various antennae and/or network interface cards, chips (e.g. Global Positioning Satellite (GPS)) etc. for wireless and/or wired communications.

Input devices 704 and output devices 710 may include any of one or more buttons, switches, pointing devices, cameras, a keyboard, a microphone, one or more sensors (e.g. biometric, etc.), a speaker, a bell, one or more lights, a haptic (vibrating) device, etc. One or more of same may be coupled via a universal serial bus (USB) or other communication channel (e.g. 722). A camera (an input device 704) may be front-oriented (i.e. on a same side as) to permit a user to capture image(s) using the camera while looking at the gesture based I/O device 706 to take a "selfie".

The one or more storage devices 712 may take different forms and/or configurations, for example, as short-term memory or long-term memory. Storage devices 712 may be configured for short-term storage of information as volatile memory, which does not retain stored contents when power is removed. Volatile memory examples include random access memory (RAM), dynamic random access memory (DRAM), static random access memory (SRAM), etc. Storage devices 712, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

It is understood that target computing device 610 may be similarly configured as developer computing device 602, in an example, albeit with fewer components to develop the model(s). Target computing device 610 may not have the first model module 104, filter 114, paired images 106, and unpaired images 102, etc. In an example, target computing device comprises a run-time-model 602B incorporated into a run-time application 614A to provide real-time translation from the first domain space to the second domain space to provide virtual or augmented reality experience for the effect applied. Target device 610 may have GUIs such as to request and display image(s) of the effect applied to images. In respect of at least some of the effects to be applied, in an example, application 614A provides an interface to purchase a respective associated product and/or service for each of the at least some effects.

Figure 8:
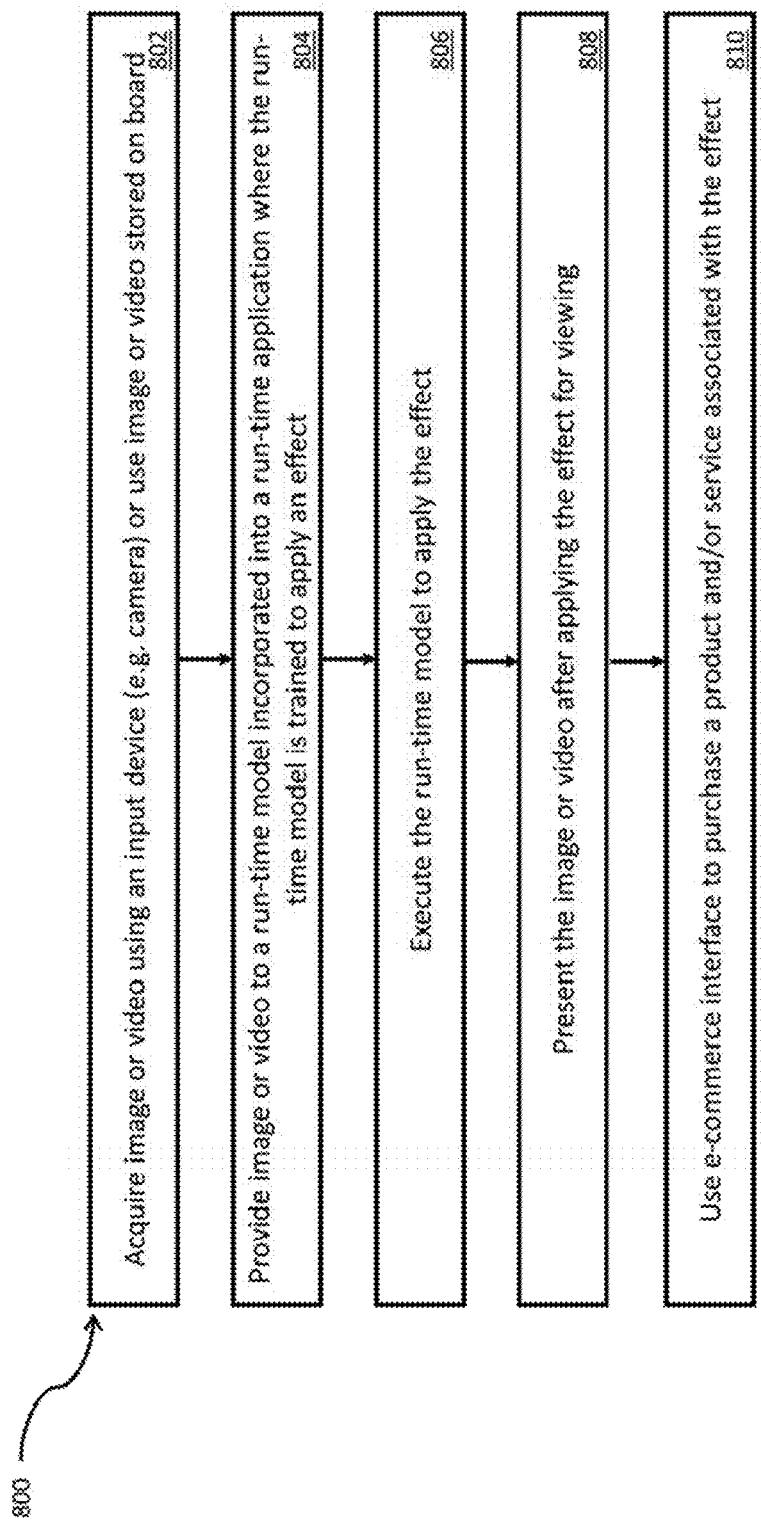
FIG. 8 is a flowchart of slowing operations of a target device, in accordance with an embodiment.

FIG. 8 is a flowchart showing operations 800 for performance by the processor of target computing device 610 in accordance with an example. At step 802, the target computing device 610 acquires an image or a video from an input device (e.g. camera) or uses an image or a video stored on board. The target computing device 610 provides the image or video to the run-time application 614 for execution in the run-time model 602B (at step 804). The run-time model 602B is one that was trained to apply an effect. The effect is a simulated or virtual effect and is associated with a product and/or service for achieving the effect in reality.

At step 806, the run-time application 614 executes the run-time model 602B to apply the effect to the image or video. The translated image or video is presented via a GUI to user 602 at step 808. At 810, the e-commerce interface of application 614 is used (e.g. with server 616 and its application 618) to purchase a product and/or service associated with the effect.

In an example, images are preprocessed by the processing unit prior to using to train any of the models herein. It may be that images are preprocessed prior to processing by any of the trained models, including the trained run-time model. Preprocessing may include any processing techniques such histogram equalization, normalization, etc.

Figure 9:
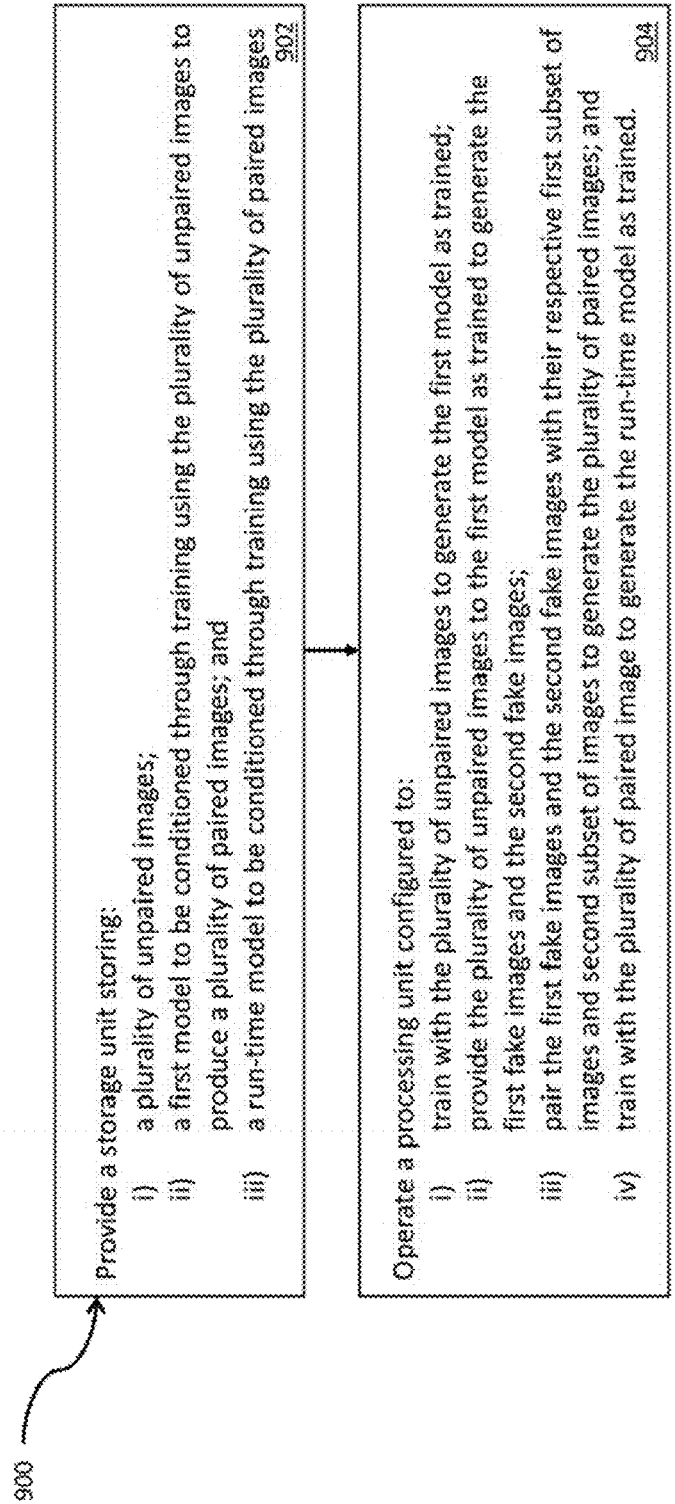

FIG. 9 shows operations 900 (e.g. an example method) to define a trained run-time model to translate an image from a first domain space to a second domain space according to an effect to be applied to the image. At 902 operations provide a storage unit storing: i) a plurality of unpaired images; ii) a first model to be conditioned through training using the plurality of unpaired images to produce a plurality of paired images and a run-time model to be conditioned through training using the plurality of paired images.

The plurality of unpaired images comprise a first subset of images defined in the first domain space having no effect applied and a second subset of images defined in the second domain space having the effect applied. Through training, the first model is configured to: 1) translate the first subset of images to the second domain space to generate first fake images to pair with the first subset; and 2) translate the second subset of images to the first domain space to generate second fake images to pair with the second subset. The first subset and the first fake images and the second subset and the second fake images respectively define a plurality of paired images.

The run-time model is configured to translate images in the first domain space to images in the second domain space and to execute on a target device when trained.

At 904 operations operate a processing unit configured to: train with the plurality of unpaired images to generate the first model as trained; provide the plurality of unpaired images to the first model as trained to generate the first fake images and the second fake images; pair the first fake images and the second fake images with their respective first subset of images and second subset of images to generate the plurality of paired images; and train with the plurality of paired image to generate the trained run-time model.

In an example, there is provided a computer program product comprising a non-transient storage unit storing instructions and/or data, which, when the instructions are executed by a processing unit of a computing device, the computing device is configured to perform a method to define a trained run-time model to translate an image from a first domain space to a second domain space according to an effect to be applied to the image In an example, device 610, for example, defines a computing device to translate an image from a first domain space to a second domain space according to an effect to be applied to the image. The computing device comprises: a processing unit and a storage unit. The storage unit stores a run-time model to translate the image from the first domain space to the second domain space, the run-time model conditioned through training using a plurality of paired images, each of the paired images comprising a first image in the first domain space and a second image in the second domain space, the plurality of paired images generated by translating a plurality of unpaired images using a first model. The plurality of unpaired images comprises a first subset of images defined in the first domain space having no effect applied and a second subset of images defined in the second domain space having the effect applied. The first model comprises a model conditioned through training using the plurality of unpaired images. The first model is thus configured to: translate the first subset of images to the second domain space to generate first fake images to pair with the first subset; and translate the second subset of images to the first domain space to generate second fake images to pair with the second subset. The first subset and the first fake images and the second subset and the second fake images respectively defined the plurality of paired images. The processing unit is configured to: provide the image teethe run-time model (e.g. to receive the effect to be applied); and provide the image as translated by the run-time model for presenting.

In an example, the first model comprises a model that is over trained so as to maximize performance on the plurality of unpaired images.

In an example, the run-time model was conditioned using paired images determined by using a filter configured to select pairs from the first subset and first fake images and the second subset and second fake images using a quality measure.

In an example, the first model comprises a machine learning model that used marginal distributions of the plurality of unpaired images to learn the joint distribution of the plurality of unpaired images. The first model may comprise a Generative Adversarial Network trained using the plurality of unpaired images and the Generative Adversarial Network may comprise any one of a Cycle Generative Adversarial Network, a Dual Generative Adversarial Network, a Cycle Consistent Adversarial Network, and a Coupled Generative Adversarial Network. In an example, the run-time model comprises a different model architecture than the first model. In an example, the run-time model comprises a minimized set of parameters and a minimized memory size. In an example, the computing device comprises one of a desktop computer, a laptop/notebook computer, a mobile device, a personal data assistance (PDA), and a tablet.

In an example, the computing device comprises reduced storage, and processing resources in comparison to a gaming computer, server or other computing device built to maximize graphics processing performance.

In an example, the run-time model is incorporated into a run-time application to provide real-time translation from the first domain space to the second domain space to provide a virtual or augmented reality experience for the effect applied.

In an example, the effect to be applied is one of a facial effect, a hair coloration effect, a hairstyle effect, a manicure effect, and a pedicure effect. In an example, the effect is associated to a product and/or service (e.g. to achieve the effect in reality) and the processing unit is configured to use an interface to interact with an ecommerce service to purchase the product and/or service.

In an example, the effect to be applied is one of a painting and a building style, a coloration of images, a filter application, a super-resolution application, a translation of features between different objects and subjects, a translation from satellite images to maps, and a translation from sketches to photographs.

In an example, the image to be translated comprises a selfie image or a selfie video. In an example, the effect to be applied is a three dimensional effect.

In an example, the computing device comprises or is coupled to a camera to capture the image for the processing unit to receive.

In an example, there is provided a computer program product comprising a non-transient storage unit storing instructions and/or data, which, when the instructions are executed by a processing unit of a computing device, the computing device is configured to perform a method to translate an image from a first domain space to a second domain space according to an effect to be applied to the image as described.

In an example, there is provided a computing device to generate a plurality of paired images from a plurality of unpaired images by translating images from a first domain space to a second domain space according to an effect to be applied to the images. The computing device comprises: a processing unit and a storage unit. The storage unit stores: the plurality of unpaired images comprising a first subset of images defined in the first domain space having no effect applied and a second subset of images defined in the second domain space having the effect applied; and a model to be over trained to maximize performance on the plurality of unpaired images. The model is configured to: translate the first subset of images to the second domain space to generate first fake images to pair having the first subset; and translate the second subset of images to the first domain space to generate second fake images to pair with the second subset. The processing unit is configured to: overfit with the plurality of unpaired images to generate the first model as overfitted; provide the plurality of unpaired images to the first model as overfitted to generate the first fake images and the second fake images; and pair the first fake images and the second fake images with their respective first subset of images and second subset images to generate the plurality of paired images.

Figure 10:
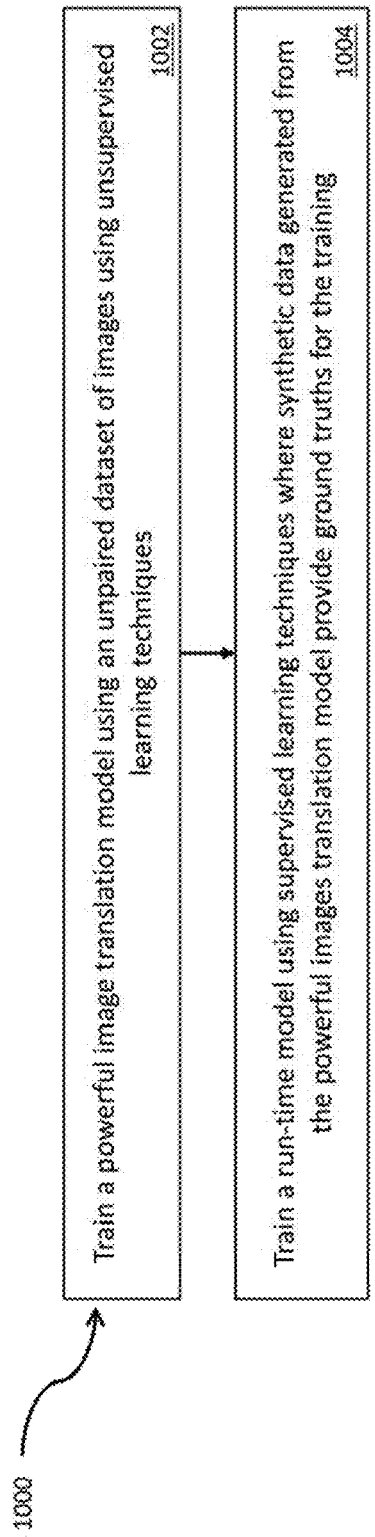

FIG. 10 shows operations 1000 (e.g. an example method) to train a model for image to image translation. At 1002 operations overfit a powerful image translation model to an unpaired dataset of images using unsupervised learning techniques. The powerful image translation model is trained to generate a synthetic paired dataset of images from the unpaired dataset; and, the unpaired dataset comprises a first subset of images in a first domain space and a second subset of image in a second domain space. At 1004 operations train a run-time model using supervised learning techniques where synthetic data generated from the powerful images translation model provide ground truths for the training. The run-time model is trained to translate images from the first domain to the second domain; and the run-time model comprises a compact and fast model in comparison to the powerful image translation model.

In an example, the run time model s provided for use by a run-time device to translate images from the first domain to the second domain. The run-time device comprises processing and storage resources at least sufficient to execute the run-time model to meet performance standards which processing and storage resources are insufficient to meet the performance standards by the run-time device when executing the powerful image translation model. That is, the run-time device does not have sufficient resources to provide comparable performance standards if it was to execute the (larger and more resource dependent) powerful image translation model. Performance standards may relate to any of time of execution, ability to execute, and user experience (quality of service).

In addition to developer and target computing device aspects, a person of ordinary skill will understand that computer program product aspects are disclosed, where instructions are stored, in a non-transient storage device (e.g. a memory, CD-ROM, DVD-ROM, disc, etc.) to configure a computing device to perform any of the method aspects stored herein.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless; it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES

1. P. Isola, J. Zhu, T. Zhou, and A. A. Efros, "Image-to-image translation with conditional adversarial networks," CoRR, vol. abs/1611.07004, 2016. arXiv: 1611.07004 [Online]. Available: arxiv.org/abs/1611.07004.
2. J.-Y. Zhu, T. Park, P. Isola, and A. A. Efros, "Unpaired image-to-Image translation using cycle-consistent adversarial networks," in Computer Vision (ICCV), 2017 IEEE International Conference on, 2017,
3. M. Brand and A. Hertzmann, "Style machines," in Proceedings of the 27th Annual Conference on Computer Graphics and Interactive Techniques, ser. SIGGRAPH '00, New York, NY, USA: ACM Press/Addison-Wesley Publishing Co., 2000, pp. 183-192, ISBN: 1-58113-208-5. SOI: 10.11451344779.344865. [Online], Available: dx. doi.org/10.1145344779.344865.
4. W. T, Freeman and J. B. Tenenbaum, "Learning bilinear models for two-factor problems in vision," in Proceedings of the 1997 Conference on Computer Vision and Pattern Recognition (CVPR '97), ser. CVPR '97, Washington, DC, USA: IEEE Computer Society, 1997, pp. 554—, ISBN: 0-81867822-4. [Online]. Available: dl.acm.org/citation.cfm?id=794189.794495.
5. E Hsu, K Pulli, and J. Popovié, "Style translation for human motion," ACM Trans, Graph., vol. 24, no. 3, pp. 1082-1089, July 2005, ISSN: 0730-0301. DOI: 10. 11451073204. 1073315. [Online]. Available doi.acm.org/10.1145/1073204. 1073315
6. L. Gatys, A. Ecker, and M. Bethge, "Image style transfer using convolutional neural networks," June 2016, pp. 2414-2423. DOI: 10.1109/CVPR.2016. 265.
7, A, Hertzmann, C. E. Jacobs, N. Oliver, B, Curless, and D. H. Salesin, "Image analogies," in Proceedings of the 28th Annual Conference on Computer Graphics and Interactive Techniques, ser. SIG-GRAPH '01, New York, NY, USA:ACM, 2001, pp. 327-340, ISBN: 1-58113-374-X. DOI: 10.1145/383259.383295. [Online]. Available: doi, acm.org/10.1145/383259.383295.
8. A. Shrivastava, T. Pfister, O. Tuzel, J. Susskind, W Wang, and R. Webb, "Learning from simulated and unsupervised images through adversarial training," CoRR, vol. abs/1612.07828, 2016. arXiv: 1612.07828. [Online]. Available: arxiv, org/abs/1612.07828.
9. I. J. Goodfellow, J. Pouget-Abadie, M. Mirza, B. Xu, D. Warde-Farley, S. Ozair, A. Courville, and Y. Bengio, "Generative Adversarial Networks." arXiv e-prints, arXiv:1406.2661, arXiv:1406.2661, June, 2014. arXiv: 1406.2661 [stat ML].
10. T. Kim, M. Cha, H. Kim, J. K. Lee, and J. Kim, "Learning to discover cross-domain relations with generative adversarial networks," CoRR, vol. abs/

11. Z. Yi, H. Zhang, P. Tan, and M. Gong, "Du-algan: Unsupervised dual learning for image-to-image translation," CoRR, vol. abs/1704.02510, 2017. arXiv: 1704.02510. [Online]. Available: arxiv.org/abs/1704.02510.
12. M. Liu, T. Breuel, and J. Kautz, "Unsupervised image-to-image translation networks," CoRR, vol. abs/1703.00848, 2017. arXiv: 1703.00848. [Online]. Available: arxiv.org/abs/1703.00848.
13. T. Zhou, P. Kränenbühl, M. Aubry, Q. Huang, and A. A. Efros, "Learning dense correspondence via 3d-guided cycle consistency," CoRR, vol. abs/1604.05383, 2016. arXiv: 1604. 05383. [Online]. Available: arxiv.org/abs/1604.05383.
14. A. Brock, J. Donahue; and K Simonyan. "Large scale GAN training for high fidelity natural image synthesis," CoRR, vol.abs/1809.11096, 2018. arXiv. 1809.11096, [Online]. Available: arxiv.org/abs/1809.11096.
15. V. Bychkovsky, S. Paris, E. Chan, and F. Durand, "Learning photographic global tonal adjustment with a database of input/output image pairs," in The Twenty-Fourth IEEE Conference on Computer Vision and Pattern Recognition, 2011.
16. Eboye photoshop action. [Online]. Avail ble:www.deviantart.com/eboye/art/Instagram-Photoshop-Action-253436319.
17. M. Heusel, H. Ramsauer, T. Unterthiner, B. Nessler, G. Klambauer, and S. Hochreiter, "Gans trained by a two time-scale update rule converge to a nash equilibrium," CoRR, abs/1706.08500, 2017. arXiv: 1706.08500. [Online]. Available: arxiv.org/abs/1706.08500.
18. O. Ronneberger, P. Fischer, and T. Brox, "U-net: Convolutional networks for biomedical image segmentation," CoRR, vol.abs/1505.04597, 2015. arXiv: 1505.04597. [Online]. Available: arxiv.org/abs/1505.04597.
19. K. He, X. Zhang, S. Ren, and J. Sun, "Deep residual learning for image recognition," RR, vol. abs/1512.03385, 2015. arXiv: 1512.03385. [Online]. Available: arxiv.org/abs/1512.03385.
20. A. Levinshtein, C. Chang, E. Phung, I. Kezele, W. Guo, and P. Aarabi, "Real-time deep hair matting on mobile devices," Co/RR, vol. abs/1712.07168, 2017. arXiv: 1712. 07168. [Online]. Available: arxiv.org/abs/1712.07168.

What is claimed is:

1. A method comprising:
    training a run-time model using supervised learning techniques where synthetic data generated from an image translation model provide ground truths for the training of the run-time model, the run-time model trained to translate images from a first domain to a second domain and the run-time model comprising a compact and fast model in comparison to the image translation model.

2. The method of claim 1, wherein the run-time model translates images from the first domain to the second domain according to an effect to be applied to the images from the first domain.

3. The method of claim 2, wherein the effect to be applied comprises one or more of a facial effect, a hair coloration effect, a hairstyle effect, a manicure effect, and a pedicure effect.

4. The method of claim 3, wherein the facial effect is applied to a face in an image from the first domain and the facial effect comprises any one or more of: a make-up effect; a skin treatment effect; a body augmentation effect; a cosmetic surgical effect; a constructive surgical effect, a reconstructive surgical effect; and an eye effect.

5. The method of claim 3, wherein the effect is associated to a product and/or a service and the method comprises incorporating the run-time model or providing the run-time model for incorporation into a run-time application having an interface to interact with an ecommerce service to purchase the product and/or the service.

6. The method of claim 1, wherein the method comprises communicating the run time model for distribution to a run-time device, the run-time device comprising processing and storage resources at least sufficient to execute the run-time model to meet performance standards, which processing and storage resources are insufficient to meet the performance standards by the run-time device when executing the image translation model.

7. The method of claim 1 comprising configuring the run-time model as a component of or for execution by a real-time application providing a virtual reality, augmented reality or mixed reality experience via a target device.

8. The method of claim 1 comprising selecting pairs of images from the synthetic paired dataset of images, responsive to a quality measure, for use to train the run-time model.

9. The method of claim 1, wherein the image translation model comprises model parameters configured through training using unsupervised learning techniques and an unpaired dataset, the unpaired dataset comprising a first subset of images in the first domain space and a second subset of images in the second domain space.

10. The method of claim 9, wherein the image translation model comprises model parameters trained by overfitting the image translation model to the unpaired dataset of images.

11. A computing device comprising a processor unit and a storage unit, the storage unit storing instructions for execution by the processor unit to cause the computing device to:
    train a run-time model using supervised learning techniques where synthetic data generated from an image translation model provide ground truths for the training of the run-time model, the run-time model trained to translate images from a first domain to a second domain and the run-time model comprising a compact and fast model in comparison to the image translation model.

12. The computing device of claim 11, wherein the run-time model translates images from the first domain to the second domain according to an effect to be applied to the images from the first domain.

13. The computing device of claim 12, wherein the effect to be applied is one of a facial effect, a hair coloration effect, a hairstyle effect, a manicure effect, and a pedicure effect.

14. The computing device of claim 13, wherein the facial effect is applied to a face in an image from the first domain and the facial effect comprises any one or more of: a make-up effect; a skin treatment effect; a body augmentation effect; a cosmetic surgical effect; a constructive surgical effect, a reconstructive surgical effect; and an eye effect.

15. The computing device of claim 13, wherein the effect is associated to a product and/or a service and the instructions for execution cause the computing device to incorporate the run-time model or provide the run-time model for incorporation into a run-time application having an interface to interact with an ecommerce service to purchase the product and/or the service.

16. The computing device of claim 11, wherein the image translation model comprises model parameters configured through training using unsupervised learning techniques and an unpaired dataset, the unpaired dataset comprising a first subset of images in the first domain space and a second subset of images in the second domain space; and the model parameters trained by overfitting the image translation model to the unpaired dataset of images.

17. A computing device comprising a processor unit and a storage unit, the storage unit storing instructions for execution by the processor unit to cause the computing device to:
provide a run-time model configured through training using supervised learning techniques where synthetic data generated from an image translation model provide ground truths for the training of the run-time model, the run-time model trained to translate images from a first domain to a second domain and the run-time model comprising a compact and fast model in comparison to the image translation model; and
receive an input image in the first domain and use the run-time model to translate the input image to the second domain.

18. The computing device of claim 17, wherein:
the run-time model translates images from the first domain to the second domain according to an effect to be applied to the images from the first domain; and
the effect to be applied comprises one or more of a facial effect, a hair coloration effect, a hairstyle effect, a manicure effect, and a pedicure effect.

19. The computing device of claim 18, wherein the facial effect is applied to a face in the image from the first domain and the facial affect comprises any one or more of: a make-up effect; a skin treatment effect; a body augmentation effect; a cosmetic surgical effect; a constructive surgical effect, a reconstructive surgical effect; and an eye effect.

20. The computing device of claim 18, wherein the effect is associated to a product and/or a service and the instructions when executed configure the computing device to provide an interface to interact with an ecommerce service to purchase the product and/or the service.

* * * * *